(12) United States Patent
Mino

(10) Patent No.: US 11,075,374 B2
(45) Date of Patent: Jul. 27, 2021

(54) METHOD FOR PRODUCING ELECTRODE ASSEMBLY AND METHOD FOR PRODUCING NONAQUEOUS ELECTROLYTE SECONDARY BATTERY

(71) Applicant: Panasonic Intellectual Property Management Co., Ltd., Osaka (JP)

(72) Inventor: Shinji Mino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/103,338

(22) Filed: Aug. 14, 2018

(65) Prior Publication Data

US 2018/0358608 A1  Dec. 13, 2018

Related U.S. Application Data

(63) Continuation of application No. PCT/JP2017/000934, filed on Jan. 13, 2017.

(30) Foreign Application Priority Data

Feb. 29, 2016 (JP) .............................. JP2016-036678

(51) Int. Cl.
*H01M 4/139* (2010.01)
*H01M 10/0587* (2010.01)
(Continued)

(52) U.S. Cl.
CPC ....... *H01M 4/139* (2013.01); *H01M 10/0431* (2013.01); *H01M 10/0583* (2013.01);
(Continued)

(58) Field of Classification Search
CPC ......... H01M 10/0431; H01M 10/0583; H01M 10/0587; H01M 2/1673; H01M 2/26; H01M 4/139
See application file for complete search history.

(56) References Cited

U.S. PATENT DOCUMENTS

| 4,730,764 A | * | 3/1988 | Hawkins | ............ | H01R 43/0207 |
| | | | | | 228/1.1 |
| 10,501,591 B2 | * | 12/2019 | Heimink | .................. | C08J 5/06 |

(Continued)

FOREIGN PATENT DOCUMENTS

| JP | 2001-38475 A | 2/2001 |
| JP | 2003-257409 A | 9/2003 |

(Continued)

OTHER PUBLICATIONS

Machine Translation JP2014167881(A) (Year: 2014).*
(Continued)

*Primary Examiner* — Victoria H Lynch
(74) *Attorney, Agent, or Firm* — Westerman, Hattori, Daniels & Adrian, LLP

(57) ABSTRACT

A method for producing an electrode assembly includes a step of ultrasonically welding an exposed portion where the surface of an electrode current collector is exposed and an electrode lead to each other. The ultrasonic welding is performed, while the exposed portion of the electrode current collector and the electrode lead are stacked on each other, with an ultrasonic horn pressed against a resin sheet disposed on the exposed portion or the electrode lead. The resin sheet includes a sheet base material and an adhesive layer formed on one surface of the base material and is bonded to a portion of the exposed portion that is to be in (Continued)

contact with the ultrasonic horn or to a portion of the electrode lead that is to be in contact with the ultrasonic horn.

10 Claims, 6 Drawing Sheets

(51) Int. Cl.
*H01M 50/46* (2021.01)
*H01M 50/531* (2021.01)
*H01M 50/538* (2021.01)
*H01M 10/04* (2006.01)
*H01M 10/0583* (2010.01)

(52) U.S. Cl.
CPC ....... *H01M 10/0587* (2013.01); *H01M 50/46* (2021.01); *H01M 50/531* (2021.01); *H01M 50/538* (2021.01)

(56) References Cited

U.S. PATENT DOCUMENTS

| | | |
|---|---|---|
| 2003/0232243 A1 | 12/2003 | Hong |
| 2005/0287431 A1* | 12/2005 | Cho .................. H01M 10/0431 |
| | | 429/161 |
| 2006/0286454 A1 | 12/2006 | Hong |
| 2007/0134558 A1* | 6/2007 | Fukunaga ......... H01M 10/0569 |
| | | 429/329 |
| 2008/0028598 A1 | 2/2008 | Hong |
| 2008/0083113 A1 | 4/2008 | Hong |
| 2009/0004561 A1* | 1/2009 | Nansaka ................ H01M 2/263 |
| | | 429/185 |
| 2009/0239133 A1 | 9/2009 | Kosugi |
| 2015/0236369 A1 | 8/2015 | Takatsuka et al. |

FOREIGN PATENT DOCUMENTS

| | | | |
|---|---|---|---|
| JP | 2004-22534 A | 1/2004 | |
| JP | 3733917 B2 | 1/2006 | |
| JP | 2008-226625 A | 9/2008 | |
| JP | 2012-243403 A | 12/2012 | |
| JP | 2014-49311 A | 3/2014 | |
| JP | 2014-167881 A | 9/2014 | |
| JP | 2014167881 A * | 9/2014 | ........ H01M 10/0585 |
| WO | 2014/034241 A1 | 3/2014 | |

OTHER PUBLICATIONS

International Search Report dated Apr. 4, 2017, issued in counterpart International Application No. PCT/JP2017/000934 (2 pages).
English Translation of Chinese Search Report dated Jun. 15, 2020 for the related Chinese Patent Application No. 201780005890.7.
Office Action dated Oct. 13, 2020, issued in counterpart JP Application No. 2018-502557, with English Translation. (4 pages).

* cited by examiner

METHOD FOR PRODUCING ELECTRODE ASSEMBLY AND METHOD FOR PRODUCING NONAQUEOUS ELECTROLYTE SECONDARY BATTERY

TECHNICAL FIELD

The present disclosure relates to a method for producing an electrode assembly and to a method for producing a nonaqueous electrolyte secondary battery.

BACKGROUND ART

A process of producing an electrode assembly used in a nonaqueous electrolyte secondary battery and the like includes, for example, a step of ultrasonically welding an electrode tab where the surface of the electrode current collector is exposed and an electrode lead to each other. PTL 1 discloses ultrasonic welding of a positive electrode lead to a positive electrode tab and a negative electrode lead to a negative electrode tab, the tabs protruding from one side of an electrode assembly in an axial direction. Such ultrasonic welding is typically performed, while an electrode tab and an electrode lead are stacked on each other, with an ultrasonic horn pressed against the electrode tab or the electrode lead.

In PTL 2, after an electrode tab and an electrode lead are ultrasonically welded to each other, the welded portion was covered with an adhesive tape. PTL 2 describes that this prevents or reduces detachment of a metal powder generated on the outer surface of the welded portion and thus prevents or reduces ingress of the metal powder into an electrode group.

CITATION LIST

Patent Literature

PTL 1: Japanese Published Unexamined Patent-Application No. 2008-226625
PTL 2: Japanese Published Unexamined Patent-Application No. 2014-49311

SUMMARY OF INVENTION

As disclosed in PTL 2, during ultrasonic welding between an electrode tab and an electrode lead, a metal in a portion in contact with an ultrasonic horn may be scraped to generate a metal powder. If ingress of the metal powder into an electrode group occurs, the metal powder may cause an internal short circuit in a battery. It is difficult to sufficiently prevent or reduce the ingress of the metal powder into an electrode group by applying the technique of PTL 2.

A method according to one aspect of the present disclosure for producing an electrode assembly includes a step of ultrasonically welding an exposed portion where a surface of an electrode current collector is exposed and an electrode lead to each other. The ultrasonic welding is performed, while the exposed portion and the electrode lead are stacked on each other, with an ultrasonic horn pressed against a resin sheet disposed on the exposed portion or the electrode lead. The resin sheet includes a sheet base material and an adhesive layer formed on one surface of the base material and is bonded to a portion of the exposed portion that is to be in contact with the ultrasonic horn or to a portion of the electrode lead that is to be in contact with the ultrasonic horn.

A method according to one aspect of the present disclosure for producing a nonaqueous electrolyte secondary battery includes a step of producing an electrode assembly by ultrasonically welding an electrode lead to an exposed portion where a surface of an electrode current collector is exposed. The ultrasonic welding is performed, while the exposed portion and the electrode lead are stacked on each other, with an ultrasonic horn pressed against a resin sheet disposed on the exposed portion or the electrode lead. The resin sheet includes a sheet base material and an adhesive layer formed on one surface of the base material and is bonded to a portion of the exposed portion that is to be in contact with the ultrasonic horn or to a portion of the electrode lead that is to be in contact with the ultrasonic horn.

The method according to one aspect of the present disclosure for producing an electrode assembly largely prevents or reduces ingress of a metal powder that may be generated by ultrasonic welding between an exposed portion of the electrode current collector and an electrode lead into an electrode group.

DESCRIPTION OF EMBODIMENTS

Figure 1:
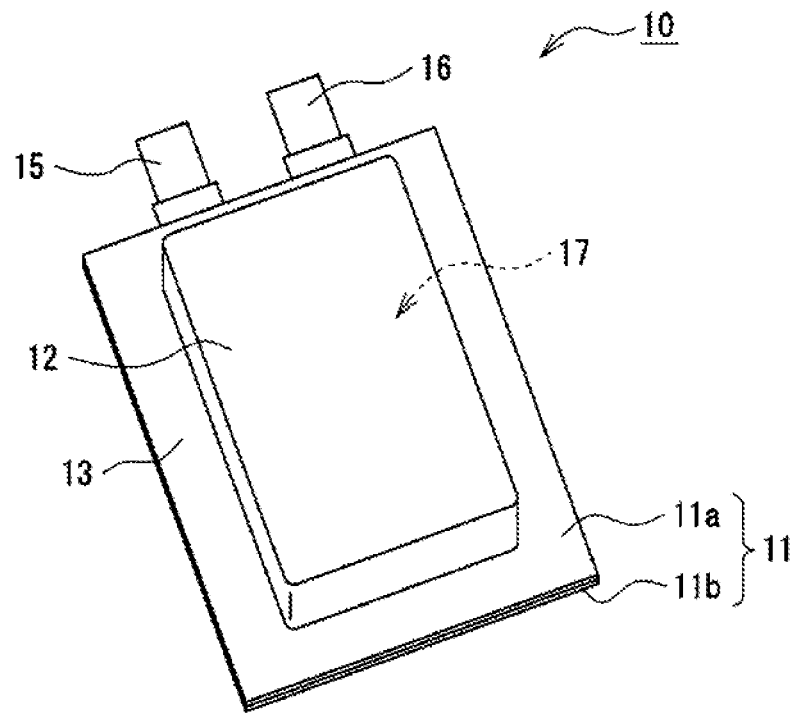
FIG. 1 is a perspective external view of one example of a nonaqueous electrolyte secondary battery according to an embodiment.

In a method according to one aspect of the present disclosure for producing an electrode assembly, ultrasonic welding is performed with a resin sheet interposed between an ultrasonic horn and an exposed portion of an electrode current collector (electrode tab) or between an ultrasonic horn and an electrode lead. In the surface of the ultrasonic horn, serrations are formed to increase pressure application force. When the serrated surface of the ultrasonic horn is pressed against a metal serving as an object to be welded and ultrasonic vibrations are applied to the metal, a metal powder is generated. In the method according to one aspect of the present disclosure for producing an electrode assembly, the ultrasonic horn is not in direct contact with the exposed portion of the electrode current collector or the electrode lead. This prevents or reduces scraping of the surface of the current collector or the surface of the lead and generation of a metal powder. Even if a metal powder is generated, the adhesive layer of the resin sheet traps the metal powder, and thus, ingress of the metal powder into the electrode group is largely prevented or reduced.

In a nonaqueous electrolyte secondary battery, when ingress of the metal powder into the electrode group occurs, the metal powder may melt under the influence of the positive electrode potential and be deposited on the surface of the negative electrode. This may lead to deterioration of battery properties and the occurrence of an internal short circuit. The method according to the present disclosure for producing an electrode assembly prevents or reduces ingress of a metal powder into an electrode group and is thus preferable particularly as a method for producing an electrode assembly used in a nonaqueous electrolyte secondary battery. In order to prevent generation of a metal powder, it may be considered that ultrasonic output be decreased or the ultrasonic treatment time be shortened. Such measures decrease welding strength and may cause poor joining and are thus not preferable.

Hereinafter, referring to the drawings, an example of an embodiment according to the present disclosure will be described in detail. The drawings referred to in the embodiment are schematically depicted. Thus, specific dimensional ratios or the like should be determined with reference to the following description.

A nonaqueous electrolyte secondary battery 10 illustrated as follows is a laminate battery including an outer body constituted by laminate films. The nonaqueous electrolyte secondary battery 10 is an example of the embodiment, and the nonaqueous electrolyte secondary battery according to the present disclosure may be a battery having another form, such as a prismatic battery or a cylindrical battery. An electrode assembly according to the present disclosure is not limited to an electrode assembly 14 of the nonaqueous electrolyte secondary battery 10 and may be an electrode assembly constituting another battery or an electrode assembly constituting a capacitor. The structure of the electrode assembly is not limited to a wound structure in which a positive electrode and a negative electrode are wound with a separator disposed therebetween and may be a stacked structure in which a plurality of positive electrodes and a plurality of negative electrodes are alternately stacked with a separator disposed therebetween.

FIG. 1 is a perspective external view of one example of the nonaqueous electrolyte secondary battery 10 according to the embodiment. As illustrated in FIG. 1, the nonaqueous electrolyte secondary battery 10 includes an outer body 11 constituted by two laminate films 11a and 11b. The nonaqueous electrolyte secondary battery 10 includes electric power generating elements such as an electrode group 17 and a nonaqueous electrolyte. The electric power generating elements are accommodated in the internal space of an accommodating portion 12 formed between the laminate films 11a and 11b. Regarding a nonaqueous electrolyte, a nonaqueous electrolyte containing, for example, a nonaqueous solvent and an electrolyte salt, such as a lithium salt, dissolved in the nonaqueous solvent is used. The nonaqueous electrolyte is not limited to a liquid and may be a solid electrolyte in which, for example, a gel polymer is used.

The shape of the outer body 11 is not particularly limited and may have, for example, an approximately rectangular shape in plan view as illustrated in FIG. 1. In the outer body 11, the laminate films 11a and 11b are joined to each other to form a sealing portion 13. The sealing portion 13 seals the internal space accommodating the electric power generating elements. The sealing portion 13 is formed in a frame along the edge of the outer body 11 and has an approximately constant width. A portion that has an approximately rectangular shape in plan view and that is surrounded by the sealing portion 13 is the accommodating portion 12. The accommodating portion 12 may be a depression that can accommodate the electric power generating elements and that is formed in at least one of the laminate films 11a and 11b. In the present embodiment, the depression is formed in only the laminate film 11a.

A pair of electrode leads (a positive electrode lead 15 and a negative electrode lead 16) constituting the electrode assembly 14 (refer to FIG. 2) is drawn from the internal space of the accommodating portion 12 to the outside. The electrode leads are drawn approximately parallel to each other from the same side of the outer body 11. A preferable material constituting the positive electrode lead 15 is a metal containing aluminum, the aluminum being a main component thereof. A preferable material constituting the negative electrode lead 16 is a metal containing copper or nickel, the copper or the nickel being a main component thereof. Each electrode lead has a thickness of, for example, about 0.1 mm to 1 mm and preferably about 0.3 mm to 0.7 mm.

Figure 2:
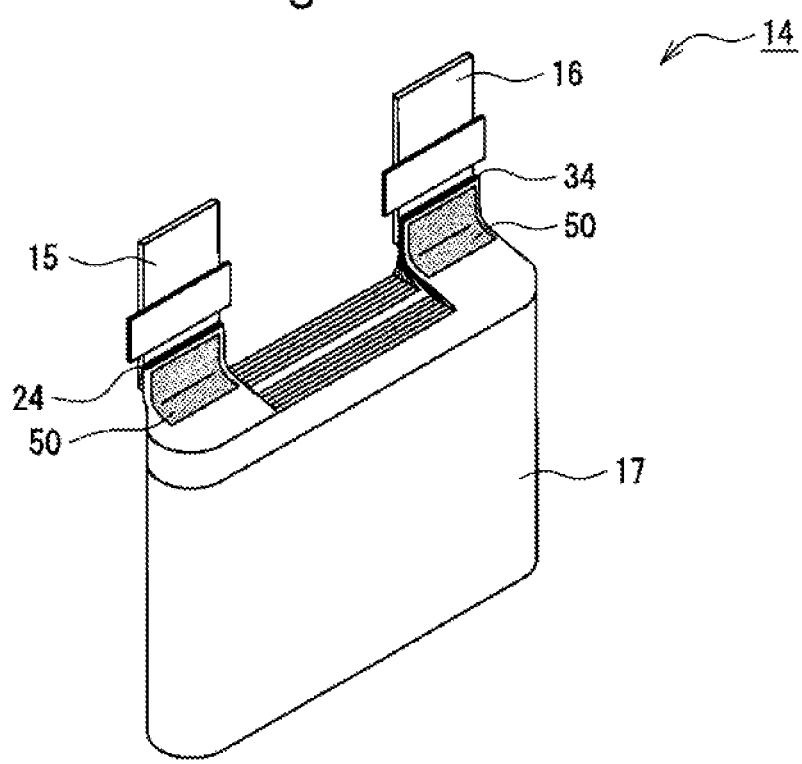
FIG. 2 is a perspective view of one example of an electrode assembly according to the embodiment.
Figure 3:
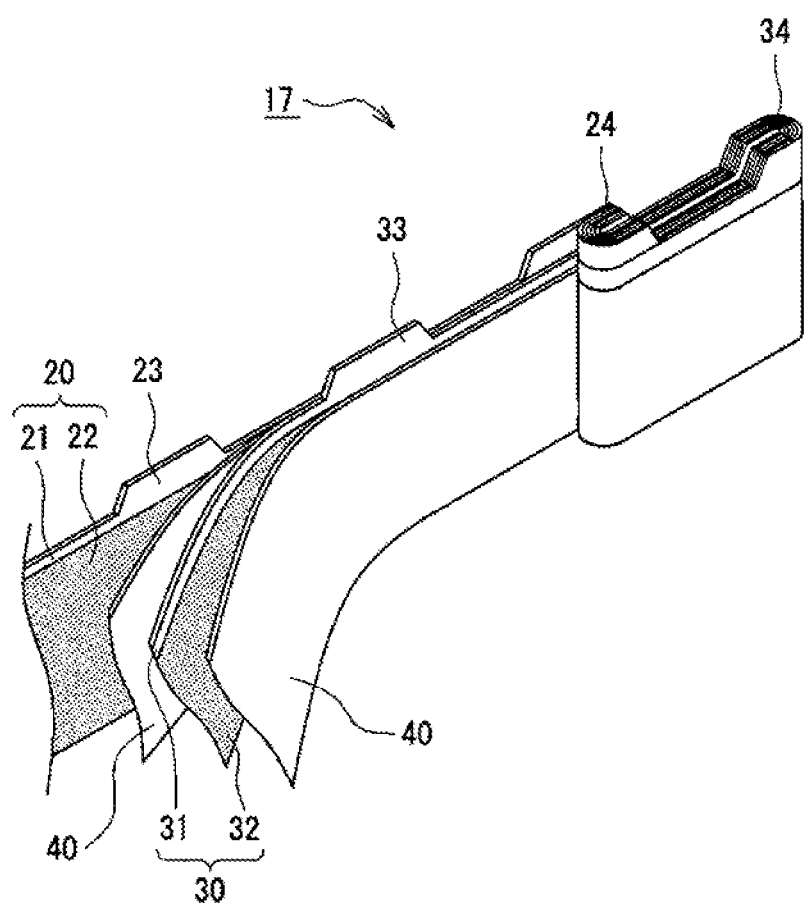
FIG. 3 is a perspective view of one example of the electrode assembly (electrode group) according to the embodiment before electrode leads are welded.

FIG. 2 is a perspective view of one example of the electrode assembly 14 according to the embodiment. FIG. 3 is a perspective view of the electrode group 17 (the electrode assembly 14 before the electrode leads are welded thereto) constituting the electrode assembly 14. The electrode group 17 refers to the electrode assembly 14 without electrode leads. As illustrated in FIG. 2 and FIG. 3, the electrode assembly 14 includes the electrode group 17 constituted by a positive electrode 20, a negative electrode 30, and separators 40, the positive electrode lead 15 connected to the positive electrode 20, and the negative electrode lead 16 connected to the negative electrode 30.

The electrode assembly 14 is produced through a step of ultrasonically welding an exposed portion where the surface of the electrode current collector is exposed and the electrode leads to each other, which will be described later. The ultrasonic welding is performed, while the exposed portion of the current collector and the electrode lead are stacked on each other, with an ultrasonic horn 60 pressed against a resin sheet 50 disposed on the exposed portion or the electrode lead. The resin sheet 50 is bonded to a portion of the exposed portion of the current collector that is to be in contact with the ultrasonic horn 60 or to a portion of the electrode lead that is to be in contact with the ultrasonic horn 60. In the example shown in FIG. 2, the resin sheet 50 is bonded to each of the surfaces of a positive electrode tab stacking portion 24 and a negative electrode tab stacking portion 34. The electrode tab stacking portions are exposed portions of the current collectors.

The electrode group 17 has a wound structure in which the positive electrode 20 and the negative electrode 30 are wound with the separator 40 disposed therebetween. Hereinafter, in the electrode group 17, the direction of the center axis of the wound structure and a direction parallel thereto are each referred to as an "axial direction". The electrode group 17 has a flattened shape formed by pressing a cylinder in one direction. A direction that is perpendicular to the "axial direction" and that is the direction along a surface of the electrode assembly 14, the surface having a flattened shape, is referred to as a "width direction". A direction that is perpendicular to the "axial direction" and the "width direction" and that is perpendicular to the surface, which has a flattened shape, is referred to as the "thickness direction or stacking direction". In the present embodiment, the separator 40, the negative electrode 30, the separator 40, and the positive electrode 20 are stacked in this order from the inside of the wound body to form the electrode group 17. The electrode group 17 may have a structure in which the negative electrode 30 and the positive electrode 20 are wound with the positive electrode 20 disposed inside with respect to the negative electrode 30.

The positive electrode 20 includes a positive electrode current collector 21 and a positive electrode active material layer 22 formed on the current collector. The positive electrode active material layer 22 is formed on each surface of the positive electrode current collector 21. The positive electrode 20 includes a plurality of positive electrode tabs 23 protruding from one side of the electrode plate. The positive electrode tab 23 is formed such that a portion of the positive electrode current collector 21 protrudes from one side of the electrode group 17 in the axial direction.

The positive electrode current collector 21 has an elongated sheet shape. The positive electrode current collector 21 may be an electroconductive thin film sheet. Examples of such a film sheet include a metal foil stable in the potential range of the positive electrode 20, such as aluminum, an alloy foil containing aluminum, the aluminum being a main component thereof, and a film including a metal layer. From the viewpoint of current collecting properties, mechanical strength, and the like, the positive electrode current collector 21 preferably has a thickness of about 5 μm to 40 μm and more preferably about 10 μm to 20 μm.

The positive electrode active material layer 22 preferably contains an electroconductive material and a binder in addition to a positive electrode active material. The positive electrode active material may be a lithium transition metal oxide containing a transition metal element, such as Co, Mn, or Ni. Examples of such a lithium transition metal oxide include $Li_xCoO_2$, $Li_xNiO_2$, $Li_xMnO_2$, $Li_xCO_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M is at least one metal element).

As described above, the positive electrode tab 23 is a convex portion protruding from one side of the electrode group 17 in the axial direction. The positive electrode tab 23 does not include the positive electrode active material layer 22 and is constituted by only the positive electrode current collector 21. The positive electrode tab 23 is an exposed portion where the surface of the positive electrode current collector 21 is exposed. In the present embodiment, the wound body has one trapezoidal positive electrode tab 23 per turn; however, neither the shape nor the number of the positive electrode tabs 23 is limited thereto.

The negative electrode 30 includes a negative electrode current collector 31 and a negative electrode active material layer 32 formed on the current collector. The negative electrode active material layer 32 is formed on each surface of the negative electrode current collector 31. The negative electrode 30 includes a plurality of negative electrode tabs 33 protruding from one side of the electrode plate. The negative electrode tab 33 is formed such that a portion of the negative electrode current collector 31 protrudes from one side of the electrode group 17 in the axial direction in the same manner as the positive electrode tab 23 is formed.

The negative electrode current collector 31 has an elongated sheet shape. The negative electrode current collector 31 may be an electroconductive thin film sheet. Examples of such a thin film sheet include a metal foil stable in the potential range of the negative electrode 30, such as copper or nickel, an alloy foil containing copper or nickel, the copper or the nickel being a main component thereof, and a film including a metal layer. The negative electrode current collector 31 preferably has a thickness of about 5 μm to 40 μm and more preferably about 10 μm to 20 μm in the same manner as the positive electrode current collector 21 does.

The negative electrode active material layer 32 preferably contains a binder in addition to a negative electrode active material that enables intercalation or deintercalation of, for example, lithium ions. Examples of such a negative electrode active material include natural graphite, synthetic graphite, lithium, silicon, carbon, tin, germanium, lead, indium, gallium, and lithium titanate, an alloy thereof, and a mixture thereof.

As described above, the negative electrode tab 33 is a convex portion protruding from one side of the electrode group 17 in the axial direction. The negative electrode tab 33 does not include the negative electrode active material layer 32 and is constituted by only the negative electrode current collector 31. The negative electrode tab 33 is an exposed portion where the surface of the negative electrode current collector 31 is exposed. In the present embodiment, the negative electrode tab 33 protrudes in the same direction as the positive electrode tab 23 protrudes, and the wound body has one trapezoidal negative electrode tab 33 per turn.

The electrode group 17 is formed by stacking and winding the positive electrode 20 and the negative electrode 30 with the separator 40 disposed therebetween such that the positive electrode tabs 23 and the negative electrode tabs 33 are alternately aligned. The positive electrode 20 and the negative electrode 30 are wound such that the plurality of positive electrode tabs 23 are stacked on each other and the plurality of negative electrode tabs 33 are stacked on each other. The plurality of positive electrode tabs 23 are stacked at one end of the electrode group 17 in the width direction to form the positive electrode tab stacking portion 24. The plurality of negative electrode tabs 33 are stacked at the other end of the electrode group 17 in the width direction to form the negative electrode tab stacking portion 34.

The positive electrode tab stacking portion 24 is compressed in the thickness direction of the electrode group 17, and the positive electrode lead 15 is welded to the positive electrode tab stacking portion 24. The resin sheet 50 is bonded to the welded portion where the positive electrode tab stacking portion 24 and the positive electrode lead are welded to each other. The negative electrode tab stacking portion 34 is also compressed in the thickness direction of the electrode group 17, and the negative electrode lead 16 is welded to the negative electrode tab stacking portion 34. The resin sheet 50 is bonded to the welded portion where the negative electrode tab stacking portion 34 and the negative electrode lead 16 are welded to each other. In the example shown in FIG. 2, the resin sheets 50 are each bonded to a surface of the positive electrode tab stacking portion opposite to the surface to which the positive electrode lead is welded and to a surface of the negative tab stacking portion opposite to the surface to which the negative electrode lead is welded.

A porous sheet having ion permeability and insulating properties is used as the separator 40. Examples of such a porous sheet include microporous thin films, woven fabric, and nonwoven fabric. The material of the separator 40 is preferably an olefin resin, such as cellulose, polyethylene, or polypropylene.

Figure 4:
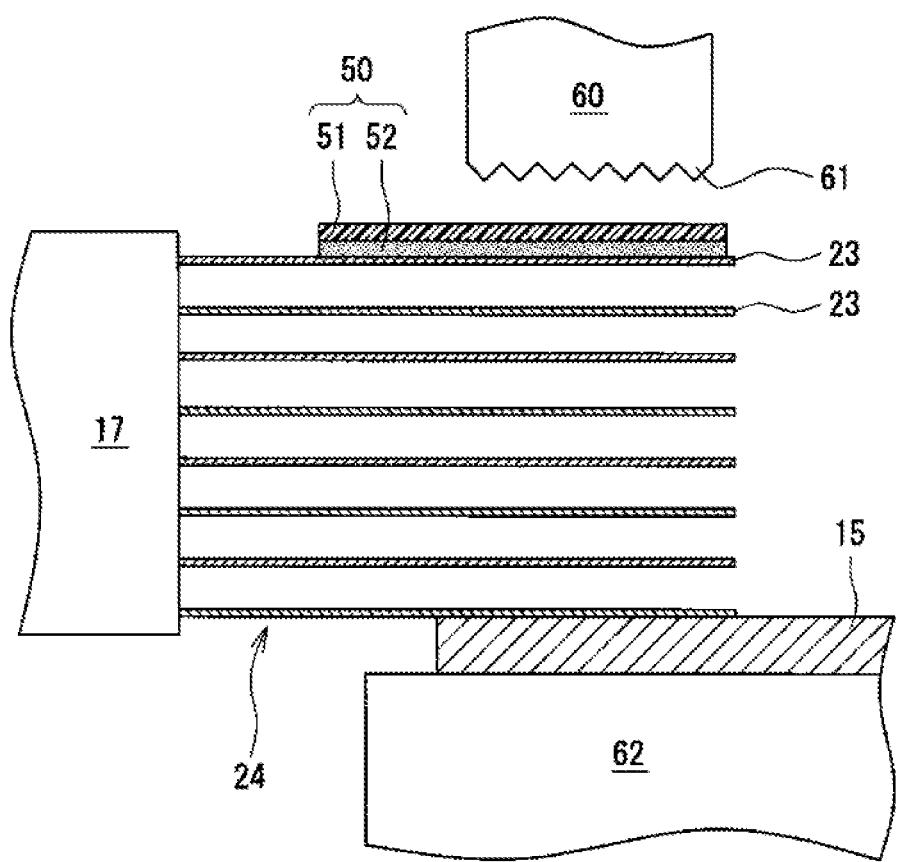
FIG. 4 illustrates one example of an ultrasonic welding process according to the embodiment.
Figure 5:
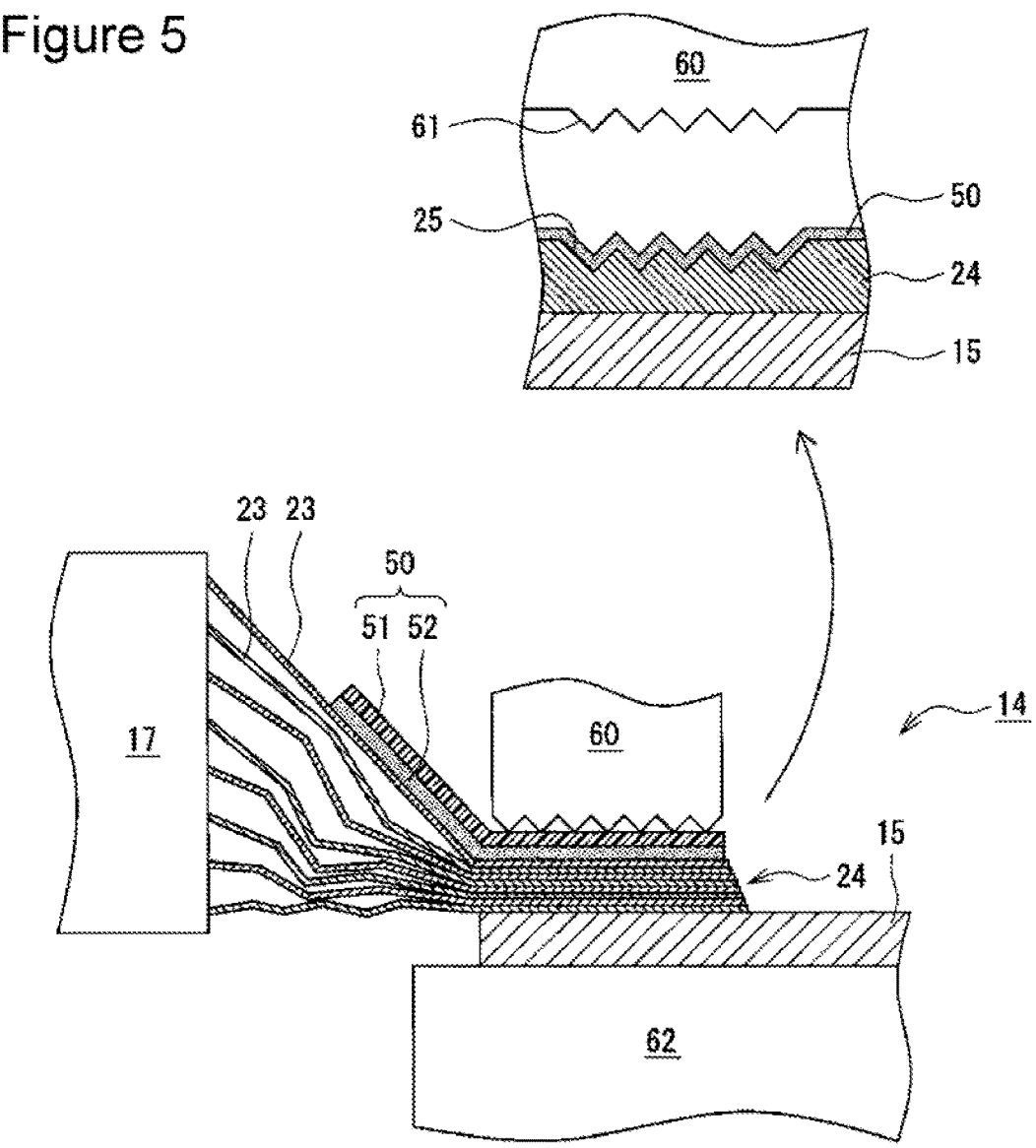
FIG. 5 illustrates one example of the ultrasonic welding process according to the embodiment.

Hereinafter, referring to FIG. 4 and FIG. 5, a method for producing the electrode assembly 14 constituting the nonaqueous electrolyte secondary battery 10 will be described in detail. FIG. 4 illustrates the positive electrode lead 15, the positive electrode tab stacking portion 24, and the resin sheet 50 that are set between the ultrasonic horn 60 and anvil 62 of aa ultrasonic welding apparatus. FIG. 5 illustrates ultrasonic welding between the positive electrode tab stacking portion 24 and the positive electrode lead 15 with the ultrasonic horn 60 pressed against the resin sheet 50 disposed on the positive electrode tab stacking portion 24.

In a process of producing the electrode assembly 14, the positive electrode 20, the negative electrode 30, and the separator 40 are initially prepared, and the electrode group 17 having a wound structure is produced. The positive electrode 20 and the like are all elongated strips and can be produced by a conventional known method. The electrode group 17 is formed by, for example, stacking the positive electrode 20, the negative electrode 30, and the two separators 40 on each other and winding them into a cylindrical shape. The positive electrode 20 and the negative electrode 30 are aligned such that the positive electrode tabs 23 and the negative electrode tabs 33 are alternately aligned in a longitudinal direction of the strips.

The electrode group 17 is produced by winding a stacked body of the above-described constituent members such that the positive electrode tabs 23 are stacked on each other and the negative electrode tabs 33 are stacked on each other and such that the electrode group 17 has a flattened shape. The positive electrode tab stacking portion 24 is formed at one end and the negative electrode tab stacking portion 34 is formed at the other end of the electrode assembly 14 in the width direction. The positive tab stacking portion is formed by, for example, stacking several tens of the positive electrode tabs on each other. The negative tab stacking portion is formed by, for example, stacking several tens of the negative electrode tabs on each other. The positive electrode tab 23 and the negative electrode tab 33 are exposed portions where their respective active material layers are not formed. Thus, the positive electrode tab 23 has the same thickness as the positive current collector, and the negative electrode tab 33 has the same thickness as the negative current collector. For example, when the positive electrode tab 23 has a thickness of 15 µm and the number of the positive electrode tabs 23 stacked is 60, the compressed positive electrode tab stacking portion 24 has a thickness of 0.9 mm.

Next, the positive electrode lead 15 and the negative electrode lead 16 are respectively joined to the positive electrode tab stacking portion 24 and the negative electrode tab stacking portion 34. Specifically, the positive electrode lead is welded to the surface of one side of the positive electrode tab stacking portion in the thickness direction (the stacking direction of the positive electrode tabs), that is, to the surface of the positive electrode tab located at the outermost portion of the positive electrode tab stacking portion. The negative electrode lead is welded to the surface of one side of the negative electrode tab stacking portion in the thickness direction (the stacking direction of the negative electrode tabs), that is, to the surface of the negative electrode tab located at the outermost portion of the negative electrode tab stacking portion. It is preferable that the positive electrode lead 15 and the negative electrode lead 16 be respectively welded to the surface of the positive electrode tab stacking portion and to the surface of the negative electrode tab stacking portion, with the surfaces facing the same direction.

The positive electrode tab stacking portion 24 and the positive electrode lead 15 are joined by ultrasonic welding in which metals are welded with each other by ultrasonic vibrations. The negative electrode tab stacking portion 34 and the negative electrode lead 16 are welded to each other in the same manner as the positive electrode tab stacking portion 24 and the positive electrode lead 15 are welded to each other. Hereinafter, referring to the positive electrode, the ultrasonic welding process will be described. Welding between the negative electrode tab stacking portion and the negative electrode lead and welding between the positive electrode tab stacking portion and the positive electrode lead may be performed simultaneously or separately.

As illustrated in FIG. 4 and FIG. 5, an ultrasonic welding apparatus includes the ultrasonic horn 60 that applies ultrasonic vibrations to the positive electrode tab stacking portion 24 and the positive electrode lead 15, which are objects to be welded, and the anvil 62 where the objects to be welded are placed. In order to increase a gripping force and a pressure application force, serrations 61 are formed in the surface of the ultrasonic horn 60. In the ultrasonic welding apparatus, for example, the oscillator outputs an electric signal to a vibrator, and the vibration energy of the vibrator is transferred to the objects to be welded through the ultrasonic horn 60 serving as a resonator.

In the example illustrated in FIG. 4 and FIG. 5, the positive electrode lead 15 and the positive electrode tab stacking portion 24 are stacked in this order and placed on the anvil 62, and the ultrasonic horn 60 is pressed against the surface of the positive electrode tab stacking portion 24 facing away from the positive electrode lead 15. In other words, the positive electrode lead 15 and the positive electrode tab stacking portion 24 are disposed between the ultrasonic horn 60 and the anvil 62 such that the positive electrode tab stacking portion 24 is located near the ultrasonic horn 60. The resin sheet 50 is disposed between the positive electrode tab stacking portion 24 and the ultrasonic horn 60 to prevent the contact therebetween.

The resin sheet 50 includes a sheet base material 51 and an adhesive layer 52 formed on one surface of the base material. The resin sheet 50 is bonded to the surface of the positive electrode tab stacking portion 24, which is the exposed portion where the surface of the current collector is exposed, at least to a portion that is to be in contact with the ultrasonic horn 60. In the present embodiment, the resin sheet 50 is bonded to a portion wider than the portion to be in contact with the ultrasonic horn 60. This enables the resin sheet 50 to be interposed between the ultrasonic horn 60 and the positive electrode tab stacking portion 24 even in a case where the ultrasonic horn 60 compresses the positive electrode tab stacking portion 24 at a position that deviates from a desired position.

The resin sheet 50 is bonded through the adhesive layer 52 to the surface of the positive electrode tab 23 located at the outermost portion of the positive electrode tab stacking portion 24. The resin sheet 50 has a function of preventing ingress of the metal powder that may be generated in the ultrasonic welding process into the electrode group 17. The resin sheet 50 needs to be interposed between the ultrasonic horn 60 and the positive electrode tab stacking portion 24 during the ultrasonic welding and may be peeled away after the ultrasonic welding process is finished; however, from the viewpoint of productivity and the like, the resin sheet 50 is preferably not to be peeled away.

The sheet base material 51 and the adhesive layer 52 are preferably constituted by a resin having good electrolytic solution resistance. The sheet base material 51 is stretched when the ultrasonic horn 60 is pressed thereagainst. Thus, the sheet base material 51 preferably has a tensile strength enough to prevent breakage thereof at this time. The adhesive layer 52 is formed by, for example, applying an adhesive to one surface of the sheet base material 51. The adhesive layer 52 enables the resin sheet 50 to be bonded to the welded portion and also has a function of trapping a metal powder when the metal powder is generated in the ultrasonic welding process. Therefore, the adhesive layer 52 is preferably formed in approximately all the region of one surface of the sheet base material 51.

The resin sheet 50 has a thickness of, for example, 15 µm to 300 µm. The resin sheet 50 preferably has a thickness of 25 µm to 150 µm and more preferably 25 µm to 50 µm. When the resin sheet 50 has a thickness in the range, the generation of a metal powder is easily prevented or reduced without disturbing the welding between the positive electrode lead 15 and the positive electrode tab stacking portion 24. The resin sheet 50 preferably has a tensile strength of 50 N/19 mm to 300 N/19 mm and more preferably 100 N/19 mm to 250 N/19 mm. In addition, the resin sheet 50 preferably has an elongation rate of 50% or more.

A resin constituting the sheet base material 51 may be any resin, provided that the resin has electrolytic solution resistance. Examples of such a resin include polyesters, such as polyethylene terephthalate and polylactic acid, polyolefins, such as polyethylene and polypropylene, polyphenylene sulfides, polyamides, and polyimides, and mixtures thereof. Among the compounds, polyolefins and polyimides are particularly preferable. The sheet base material 51 may have either a monolayer structure or a stacked structure. A resin (adhesive) constituting the adhesive layer 52 may be any resin, provided that the resin has electrolytic solution resistance. The resin is preferably a pressure sensitive adhesive having adhesive properties at normal temperature. A commercially available adhesive tape can be used as the resin sheet 50.

In the present ultrasonic welding process, ultrasonic welding is performed with the resin sheet 50 disposed between the positive electrode tab stacking portion 24 and the ultrasonic horn 60. In other words, ultrasonic welding is performed with the ultrasonic horn 60 pressed against the resin sheet 50 disposed on the surface of the positive electrode tab stacking portion 24. In the present ultrasonic welding process, the positive electrode tab stacking portion 24 is compressed in the thickness direction and pressed against the positive electrode lead 15 by the ultrasonic horn 60. Then, the positive electrode tab stacking portion 24 and the positive electrode lead 15 are welded to each other by ultrasonic vibrations of the ultrasonic horn 60. At this time, the positive electrode tabs 23 constituting the positive electrode tab stacking portion 24 are also welded to each other.

Figure 8:
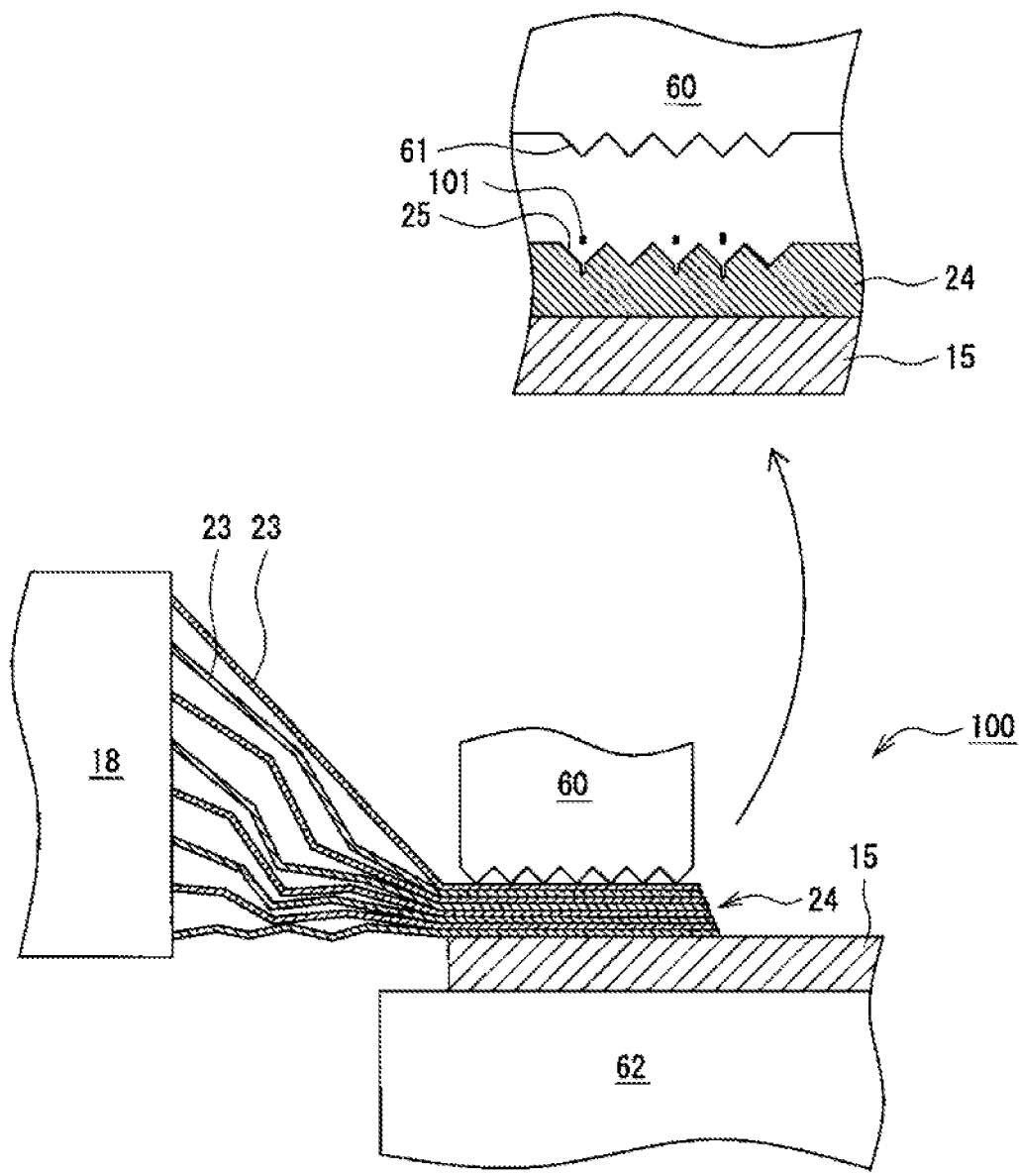
FIG. 8 illustrates a comparative example of the ultrasonic welding process.

Here, the ultrasonic welding process in which the resin sheet 50 is used will be described in comparison with the conventional ultrasonic welding process illustrated in FIG. 8. In the example illustrated in FIG. 8, with the ultrasonic horn 60 being directly in contact with the positive electrode tab 23 constituting the positive electrode tab stacking portion 24, the positive electrode tab stacking portion 24 and the positive electrode lead 15 are ultrasonically welded to each other to produce an electrode assembly 100. The serrations 61 are formed in a surface of the ultrasonic horn 60 that is to be in contact with the positive electrode tab stacking portion 24. Thus, when the ultrasonic horn 60 is pressed against the positive electrode tab stacking portion 24, serrations 25 corresponding to the serrations 61 are formed in the positive electrode tab stacking portion 24. When the ultrasonic horn 60 is vibrated while compressing objects to be welded, frictional heat is generated between metals of the objects to be welded, and thus, the metals are welded to each other. At this time, in a conventional method, the metal (the positive electrode tab 23) is scraped to generate a metal powder 101. In particular, it is considered that the metal be likely to be scraped in the portions in contact with tips of convex portions of the serrations 61 of the ultrasonic horn 60, that is, in the portions located at the bottom of recessed portions of the serrations 25 of the positive electrode tab stacking portion 24.

On the other, hand, as illustrated in FIG. 5, the positive electrode tab stacking portion 24 and the positive electrode lead 15 are ultrasonically welded to each other with the resin sheet 50 interposed between the ultrasonic horn 60 and the positive electrode tab stacking portion 24. This prevents or reduces generation of a metal powder. As described above, the resin sheet 50 is bonded to a portion of the surface of the positive electrode tab 23, which constitutes the positive electrode tab stacking portion 24, that is to be in contact with the ultrasonic horn 60. Even when the resin sheet 50 is used, the serrations 25 corresponding to the serrations 61 of the ultrasonic horn 60 are formed in the positive electrode tab stacking portion 24; however, the ultrasonic horn 60 is not in direct contact with the positive electrode tab 23, thereby preventing the positive electrode tab 23 from being scraped. Even if a portion of the positive electrode tab 23 is scraped to generate a metal powder, the metal powder is incorporated into the adhesive layer 52 of the resin sheet 50, thereby preventing ingress of the metal powder into the electrode group 17.

As described above, the ultrasonic welding method in which a resin sheet having the adhesive layer 52 is used largely prevents or reduces, ingress of a metal powder that may be generated by ultrasonic welding into the electrode group 17. When the positive electrode lead 15 is disposed near the ultrasonic horn 60, the resin sheet 50 may be bonded to a portion of the positive electrode lead 15 that is to be in contact with the ultrasonic horn 60. The resin sheet 50 may be bonded to a portion of the positive electrode tab 23 that is to be in contact with the anvil 62 or to a portion of the positive electrode lead 15 that, is to be in contact with the anvil 62.

The electrode group 17 to which the positive electrode lead 15 and the negative electrode lead 16 are ultrasonically welded is accommodated with an electrolyte in the accommodating portion 12 of the laminate film 11*a*. The laminate film 11*b* is stacked on the laminate film 11*a*, and the periphery of the accommodating portion 12 is heat-sealed with each lead disposed between the films to form the sealing portion 13. This seals the internal space of the accommodating portion 12 and provides the nonaqueous electrolyte secondary battery 10 having portion of the leads drawn from the accommodating portion 12.

Figure 6:
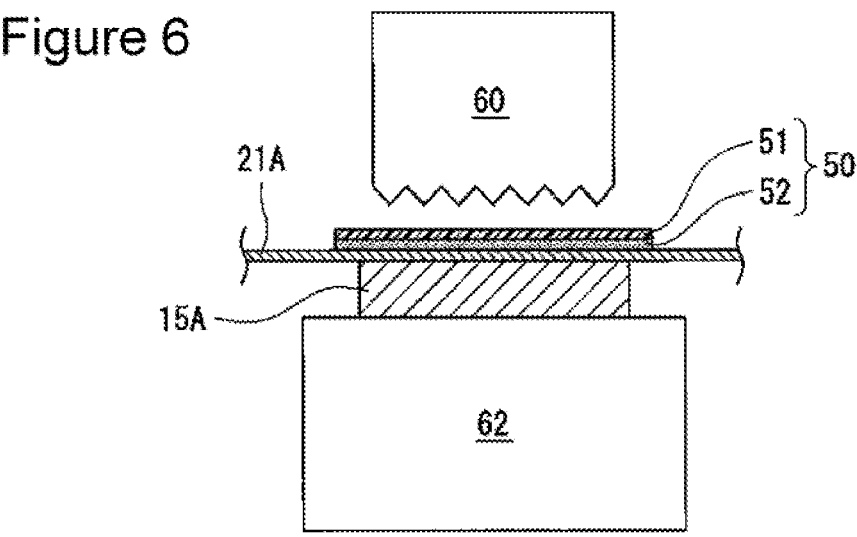
FIG. 6 illustrates another example of the ultrasonic welding process according to the embodiment.
Figure 7:
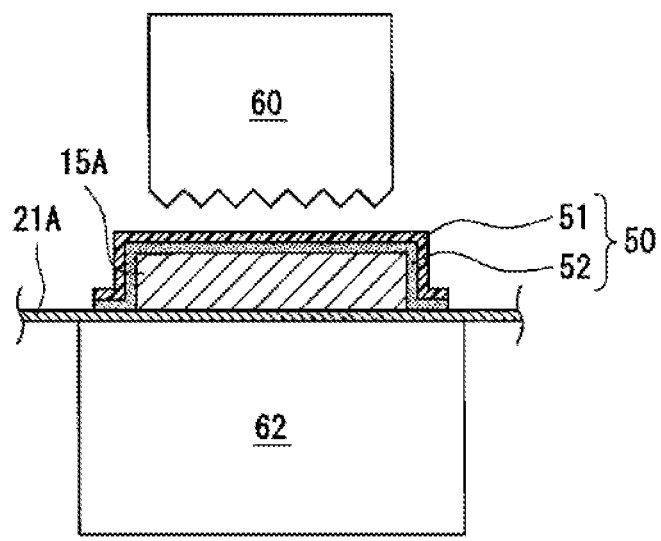
FIG. 7 illustrates another example of the ultrasonic welding process according to the embodiment.

FIG. 6 and FIG. 7 illustrate ultrasonic welding between an exposed portion where the surface of a positive electrode current collector 21A is exposed and a positive electrode lead 15A. In the examples illustrated in FIG. 6 and FIG. 7, the positive electrode current collector 21A having one layer and the positive electrode lead 15A are welded to each other. Such a case may be, for example, a case in which an electrode lead is welded to a current collector of an electrode group having a wound structure with a cylindrical shape. The positive electrode lead 15A is welded, for example, to the center portion of the strip-formed positive electrode current collector 21A in the longitudinal direction.

In the example illustrated in FIG. 6, the positive electrode lead 15A and the positive electrode current collector 21A are stacked in this order and disposed on the anvil 62, and ultrasonic welding is performed with the ultrasonic horn 60 pressed against the resin sheet 50 disposed on the positive electrode current collector 21A. In this case, the resin sheet 50 is bonded to a portion of the positive electrode current collector 21A that is to be in contact with the ultrasonic horn 60. The resin sheet 50, for example, has a width wider than that of the positive electrode lead 15A and is bonded to the positive electrode current collector 21A, with the edges of the resin sheet 50 extended from the edges of the lead.

In the example illustrated in FIG. 7, the positive electrode current collector 21A and the positive electrode lead 15A are stacked in this order and disposed on the anvil 62, and ultrasonic welding is performed with the ultrasonic horn 60 pressed against the resin sheet 50 disposed on the positive electrode lead 15A. In this case, the resin sheet 50 is bonded to at least a portion of the positive electrode lead 15A that is to be in contact with the ultrasonic horn 60, that is, to the surface facing the ultrasonic horn 60. The resin sheet 50, for example, further covers and is bonded to side surfaces of the positive electrode lead 15A and a portion of the positive electrode current collector 21A that is located around the lead. In each example illustrated in FIG. 6 and FIG. 7, generation of a metal powder is prevented or reduced. Even if a metal powder is generated, the adhesive layer 52 of the resin sheet 50 can trap the metal powder.

Table 1 shows the relation between the output and time of the ultrasonic treatment and the welded state and the presence/absence of metal powder generation. As an ultrasonic metal welding apparatus, 40MA Ultrasonic Welder (Oscillator 2000Xea) manufactured by Emerson Japan, Ltd. was used. A test tab was a stack of 30 aluminum foils, each foil having a thickness of 15 µm. A test lead was an aluminum plate (size: 50 mm×30 mm) having a thickness of 500 µm. The stacked body, which was the test tab, was stacked on the test lead, and ultrasonic welding in the present test was performed with an ultrasonic horn pressed against the test tab. A in Table 1 shows a result of the test performed with a polyimide sheet (No. 360A manufactured by Nitto Denko Corporation), which has an adhesive layer, bonded to a portion of the test tab that was to be in contact with the ultrasonic horn. X in Table 1 shows a result of the test performed without the resin sheet bonded. Joining strength between the test tab and the test lead was evaluated based on tensile strength (measured by using SV-55C. manufactured by IMADA SEISAKUSHO CO., LTD). The desired tensile strength was set to 130 N or more. The presence/absence of a metal powder was visually confirmed.

When the ultrasonic output was set to 80% or more, and the treatment time was set to 0.15 seconds or more, the desired joining strength was obtained. Under this condition, when a polyimide resin sheet was bonded to a portion of the test tab that was to be in contact with an ultrasonic horn, the presence of a metal powder was not confirmed. A resin sheet including a base material having a thickness of about 25 µm (total thickness was about 50 µm) and a resin sheet including a base material having a thickness of about 50 µm (total thickness was about 80 µm) were used. In both cases, the desired joining strength was obtained, and the presence of a metal powder was not confirmed. On the other hand, when a resin sheet is not used under the same condition, the desired joining strength was obtained; however, generation of a metal powder was confirmed. The joining strength was not changed by the presence/absence of a resin sheet.

INDUSTRIAL APPLICABILITY

The present invention can be used in a method for producing an electrode assembly and a method for producing a nonaqueous electrolyte secondary battery.

REFERENCE SIGNS LIST 10 nonaqueous electrolyte secondary battery
11 outer body
11a, 11b laminate film
12 accommodating portion
13 sealing portion
14 electrode assembly
15 positive electrode lead
16 negative electrode lead
17 electrode group

TABLE 1

| | Treatment time (sec) | | | | |
|---|---|---|---|---|---|
| | 0.100 | 0.125 | 0.150 | 0.175 | 0.200 |
| Output 70% | Not joined X: metal powder absent | Not joined X: metal powder absent | Not joined X: metal powder absent | Not joined X: metal powder present | Not joined X: metal powder present |
| Output 80% | Not joined X: metal powder present | Not joined X: metal powder present | Joined A: metal powder absent X: metal powder present | Joined A: metal powder absent X: metal powder present | Joined A: metal powder absent X: metal powder present |
| Output 90% | Not joined X: metal powder present | Not joined X: metal powder present | Joined A: metal powder absent X: metal powder present | Joined A: metal powder absent X: metal powder present | Joined A: metal powder absent X: metal powder present |
| Output 100% | Not joined X: metal powder present | Not joined X: metal powder present | Joined A: metal powder absent X: metal powder present | Joined A: metal powder absent X: metal powder present | Joined A: metal powder absent X: metal powder present |

As shown in Table 1, when the ultrasonic output was low and the treatment time was short (output 70%, treatment time 0.15 seconds or less), a metal powder was not produced; however, the desired joining strength was not obtained. In a case where the ultrasonic output was high (80% or more) and the treatment time was short (0.125 seconds or less) and in a case where the ultrasonic output was 70% and the treatment time was 0.175 seconds or 0.2 seconds, the desired joining strength was not obtained, and a metal powder was generated.

20 positive electrode
21 positive electrode current collector
22 positive electrode active material layer
23 positive electrode tab
24 positive electrode tab stacking portion
25 serrations
30 negative electrode
31 negative electrode current collector
32 negative electrode active material layer
33 negative electrode tab
34 negative electrode tab stacking portion 40 separator
50 resin sheet
51 sheet base material
52 adhesive layer
60 ultrasonic horn
61 serrations
62 anvil

The invention claimed is:

1. A method for producing an electrode assembly, the method comprising a step of ultrasonically welding an exposed portion where a surface of an electrode current collector is exposed and an electrode lead to each other,
wherein the ultrasonic welding is performed, while the exposed portion and the electrode lead are stacked on each other, with an ultrasonic horn having serrations formed in a surface thereof pressed against a resin sheet disposed on the exposed portion or the electrode lead,
the resin sheet includes a sheet base material and an adhesive layer formed on one surface of the base material and is bonded to a portion of the exposed portion that is to be in contact with the ultrasonic horn or to a portion of the electrode lead that is to be in contact with the ultrasonic horn, and
the resin sheet has a tensile strength of 50 N/19 mm to 300 N/19 mm.

2. The method for producing an electrode assembly according to claim 1, the method comprising:
stacking electrode tabs that are exposed portions of the electrode current collector on each other to form a tab stacking portion; and
ultrasonically welding the tab stacking portion and the electrode lead to each other.

3. The method for producing an electrode assembly according to claim 1, wherein the resin sheet has a thickness of 15 μm to 300 μm.

4. The method for producing an electrode assembly according to claim 1,
wherein the sheet base material includes at least one of the group consisting of polyethylene terephthalate, polyphenylene sulfides and polyamides.

5. The method for producing an electrode assembly according to claim 1,
wherein during the step of ultrasonically welding the adhesive layer directly contacts the electrode lead, and the base material directly contacts the ultrasonic horn.

6. The method for producing an electrode assembly according to claim 1,
wherein the resin sheet further covers and is bonded to side surfaces of the electrode lead and a portion of the electrode current collector that is directly adjacent to the electrode lead.

7. The method for producing an electrode assembly according to claim 1,
wherein the ultrasonic welding is performed with the ultrasonic horn pressed against the resin sheet disposed on the electrode lead,
the resin sheet is bonded to the portion of the electrode lead that is to be in contact with the ultrasonic horn, and
the resin sheet further covers and is bonded to side surfaces of the positive electrode lead and a portion of the positive electrode current collector that is located around the lead.

8. The method for producing an electrode assembly according to claim 1,
wherein the resin sheet has a tensile strength of 100 N/19 mm to 250 N/19 mm.

9. A method for producing a nonaqueous electrolyte secondary battery, the method comprising a step of producing an electrode assembly by ultrasonically welding an electrode lead to an exposed portion where a surface of an electrode current collector is exposed,
wherein the ultrasonic welding is performed, while the exposed portion and the electrode lead are stacked on each other, with an ultrasonic horn having serrations formed in a surface thereof pressed against a resin sheet disposed on the exposed portion or the electrode lead,
the resin sheet includes a sheet base material and an adhesive layer formed on one surface of the base material and is bonded to a portion of the exposed portion that is to be in contact with the ultrasonic horn or to a portion of the electrode lead that is to be in contact with the ultrasonic horn, and
the resin sheet has a tensile strength of 50 N/19 mm to 300 N/19 mm.

10. A method for producing an electrode assembly, the method comprising a step of ultrasonically welding an exposed portion where a surface of an electrode current collector is exposed and an electrode lead to each other,
wherein the ultrasonic welding is performed, while the exposed portion and the electrode lead are stacked on each other, with an ultrasonic horn having serrations formed in a surface thereof pressed against a resin sheet disposed on the exposed portion or the electrode lead,
the resin sheet includes a sheet base material and an adhesive layer formed on one surface of the base material and is bonded to a portion of the exposed portion that is to be in contact with the ultrasonic horn or to a portion of the electrode lead that is to be in contact with the ultrasonic horn,
wherein the ultrasonic welding is performed with the ultrasonic horn pressed against the resin sheet disposed on the exposed portion, and
the resin sheet has a width wider than that of the positive electrode lead and is bonded to the exposed portion that is to be in contact with the ultrasonic horn with edges of the resin sheet extended from edges of the lead.

* * * * *